(12) United States Patent
Shin et al.

(10) Patent No.: US 7,308,140 B2
(45) Date of Patent: Dec. 11, 2007

(54) METHOD AND DEVICE FOR MEASURING SIMILARITY BETWEEN IMAGES

(75) Inventors: Hyun-doo Shin, Seongnam (KR); Yang-lim Choi, Suwon (KR); Bangalore S. Manjunath, Santa Barbara, CA (US); Peng Wu, Santa Barbara, CA (US)

(73) Assignees: Samsung Electronics Co., Ltd., Suwon (KR); The Regents of the University of California, Oakland, CA (US); Applera Corporation, Norwalk, CT (US)

( * ) Notice: Subject to any disclaimer, the term of this patent is extended or adjusted under 35 U.S.C. 154(b) by 596 days.

(21) Appl. No.: 09/822,853

(22) Filed: Apr. 2, 2001

(65) Prior Publication Data

US 2002/0006221 A1 Jan. 17, 2002

Related U.S. Application Data

(60) Provisional application No. 60/207,958, filed on May 31, 2000.

(30) Foreign Application Priority Data

| Aug. 21, 2000 | (KR) | ................................ 00-48324 |
| Mar. 30, 2001 | (EP) | ................................ 01303087 |
| Mar. 31, 2001 | (JP) | ................................ 2001-165519 |

(51) Int. Cl.
*G06K 9/62* (2006.01)
*G06K 9/68* (2006.01)

(52) U.S. Cl. .................... 382/209; 382/217; 382/218; 382/219; 382/220

(58) Field of Classification Search ................ 382/209, 382/215, 217–220, 224, 225; 396/128
See application file for complete search history.

(56) References Cited

U.S. PATENT DOCUMENTS 5,394,483 A * 2/1995 Daly ........................... 382/270
5,644,655 A * 7/1997 Windsor ...................... 382/209

(Continued)

FOREIGN PATENT DOCUMENTS

JP 9-101970 4/1997

(Continued)

OTHER PUBLICATIONS

Weinshall, "On view likelihood and stability", I.E.E.E. Pattern Analysis and Machine Intelligence, vol. 19, pp. 97-108, Feb. 1997.*

(Continued)

*Primary Examiner*—Brian Le
(74) *Attorney, Agent, or Firm*—Sughrue Mion Pllc.

(57) ABSTRACT

A method of measuring a similarity between images is provided. The method includes the steps of (a) computing a statistical dissimilarity between the images; (b) computing a perceptual dissimilarity between the images; and (c) computing a dissimilarity between the texture features of the images based on the statistical dissimilarity and the perceptual dissimilarity. When images perceptually similar to a query image are searched and retrieved according to the above measuring method, the possibility that the retrieved images are not perceptually similar to the query image is small. Accordingly, the image searching performance can be improved when searching images having texture features similar to that of a query image.

9 Claims, 3 Drawing Sheets

U.S. PATENT DOCUMENTS

| | | | | |
|---|---|---|---|---|
| 5,852,823 | A | * | 12/1998 | De Bonet ........................ 707/6 |
| 5,949,055 | A | * | 9/1999 | Fleet et al. .................. 235/469 |
| 6,229,931 | B1 | * | 5/2001 | Essafi et al. ................ 382/305 |
| 6,256,409 | B1 | * | 7/2001 | Wang .......................... 382/170 |
| 6,360,017 | B1 | * | 3/2002 | Chiu et al. .................. 382/239 |
| 6,529,631 | B1 | * | 3/2003 | Peterson et al. ............. 382/232 |
| 6,591,006 | B1 | * | 7/2003 | Niemann .................... 382/162 |

FOREIGN PATENT DOCUMENTS

| | | |
|---|---|---|
| JP | 9-101970 A | 4/1997 |
| JP | 10-154149 | 6/1998 |
| JP | 10-154149 A | 6/1998 |
| JP | 11-110556 A | 4/1999 |
| KR | 10-2000-0014123 A | 3/2000 |

OTHER PUBLICATIONS

Chang, "Data Resource Selection in Distributed Visual Information Systems", I.E.E.E. Knowledge and Data Engineering, vol. 10, pp. 926-946 Nov. 1998.*

Mojsilovic et al: "Perceptually based color texture features and metrics for image retrieval" Image Processing, 1999,. ICIP 99. Proceedings. 1999 International Conference on Kobe, Japan Oct. 24-28, 1999, Piscataway, NJ USA IEEE, US, Oct. 24, 1999; pp. 588-592; XP010368784.

Wu et al.; A texture descriptor for image retrieval and browsing:, Content-Based access of Image and Video Libraries, 1999. (CBAIVL '99), Proceedings. IEEE Workshop on Fort Collins, Co, USA Jun. 22, 1999, Los Alamitos, CA, USA, IEEE Comput, Soc, US, 1999, pp. 3-7, XP010343827.

Frese et al: "Methodology for designing image similarity metrics based on human visual system models" Human Vision and Electronic Imaging II, San Jose, CA, USA, Feb. 10-13, 1997, vol. 3016, pp. 472-483, XP002209100.

Liu et al: "Periodicity, Directionality, and Randomness: Wold Features for Image Modeling and Retrieval" IEEE Transactions on Pattern Analysis and Machine Intelligence, IEEE Inc. New York, vol. 18, No. 7, Jul. 1, 1996, pp. 722-733, XP000620248.

Squire et al.: "Learning a similarity-based distance measure for image database organization from human partitionings of an image set" Applications of Computer Vision , 1998, WACV '98, Proceedings., Fourth IEEE Workshop o Princeton, NJ, USA, Oct. 19-21, 1998, Los Alimitos CA, USA, IEEE Comput. SOC, US, Oct. 19, 1998, pp. 88-93, XP010315544.

Mojsilović, et al.; Perceptually Based Color Texture Features and Metrics for Image Retrieval; pp. 588-592.

Aki Kobayashi, et al. "Interactive Image-Retrieval System based on Feature-Space Reduction", The Journal of the Institute of Image Information and Television Engineers, vol. 52, No. 7, 1998, pp. 1040-1047.

Aki Kobayashi, et al. "Interactive Image-Retrieval System based on Feature-Space Reduction", vol. 52, No. 7, pp. 1040-1047 (1998).

* cited by examiner

METHOD AND DEVICE FOR MEASURING SIMILARITY BETWEEN IMAGES

This is a non-provisional application of pending provisional application 60/207,958 (filed May 31, 2000), and further claims the benefit of Korean Patent Application No. 00-48324. The contents of both documents are incorporated by reference.

BACKGROUND OF THE INVENTION

1. Field of the Invention

The present invention relates to a device for measuring the similarity between images and a method used by the same, and more particularly, to a method and device for accurately measuring the similarity between images.

2. Description of the Related Art

For applications of image search and retrieval, the characterization of the statistical attribute of textures is widely used. Texture descriptors are obtained according to such characterization. A texture descriptor is composed of two components: a similarity retrieval component (SRC) based on statistics and a perceptual browsing component (PBC) which is developed for describing the perceptual attributes of textures, such as the directionality and the texture's regularity. Such a texture descriptor is used for browsing and classifying images. The browsing and classifying of images are based on a measure of a distance. The measure of a distance is defined based on a feature vector and provides the similarity/dissimilarity between images.

A conventional similarity measuring method uses a statistical-based texture descriptor. According to this method, when the radius of a sphere centered at the feature vector of a query image is expanded in a feature vector space, if other feature vectors fall within the sphere, it is determined that the possibility that the query image is perceptually similar to the texture features of images corresponding to the feature vectors is very high.

However, for images corresponding to feature vectors newly falling within the sphere when the radius of the sphere is continuously increased in such a conventional similarity measuring method, the possibility that they are perceptually similar to the query image drops rapidly. Accordingly, the conventional similarity measuring method using a statistical-based texture descriptor has a problem in that an image which has been retrieved as being perceptually similar to a query image may not have a perceptual similarity to the query image.

SUMMARY OF THE INVENTION

To solve the above problem, it is a first object of the present invention to provide a method of accurately measuring the similarity between two images.

It is a second object of the present invention to provide a computer-readable recording medium for storing a computer program for executing the above method of measuring the similarity between images.

It is a third object of the present invention to provide a device for performing the above method of measuring the similarity between images.

Accordingly, to achieve the first object of the invention, in one aspect, there is provided a method of measuring the similarity between images. The method includes (a) computing a statistical dissimilarity between the images; (b) computing a perceptual dissimilarity between the images; and (c) computing a dissimilarity between the texture features of the images based on the statistical dissimilarity and the perceptual dissimilarity.

Preferably, the step (b) includes the steps of (b-1) computing regularity of the texture of the images; and (b-2) computing a dissimilarity between the computed regularities of texture of the images.

Preferably, the step (c) includes the steps of (c-1) determining the dissimilarity between the texture features as a value proportional to the statistical dissimilarity when the perceptual dissimilarity is smaller than a predetermined threshold.

In addition, it is preferable that the step (c) includes the steps of (c-1) determining the dissimilarity between the texture features based on the exponent of the power of the statistical dissimilarity, the exponent being the perceptual dissimilarity, when the perceptual dissimilarity is smaller than a predetermined threshold.

In another aspect, there is provided a method of measuring the similarity between images. The method includes the steps of (a) computing a statistical dissimilarity $d(i, j)$ between two images i and j using a statistical-based texture descriptor; (b) obtaining quantitative measurements $P^{(i)}$ and $P^{(j)}$ of texture patterns of the two images i and j in terms of regularity; and (c) obtaining a dissimilarity between the texture features by computing a dissimilarity $\hat{d}(|P^{(i)}-P^{(j)}|)$ between the texture patterns of the two images i and j in terms of regularity, where $\hat{d}$ is assumed to be a predetermined function whose value is determined according to the range of a magnitude of a perceptual dissimilarity.

To achieve the second object of the invention, there is provided a computer-readable recording medium storing a computer program for executing a method of measuring a similarity between texture features of images. The medium includes a computer readable means for (a) computing a statistical dissimilarity $d(i, j)$ between two images i and j using a statistical-based texture descriptor; (b) obtaining quantitative measurements $P^{(i)}$ and $P^{(j)}$ of texture patterns of the two images i and j in terms of regularity; and (c) obtaining a dissimilarity between the texture features by computing a dissimilarity $\hat{d}(|P^{(i)}-P^{(j)}|)$ between the texture patterns of the two images i and j in terms of regularity, where $\hat{d}$ is assumed to be a predetermined function whose value is determined according to the range of a magnitude of a perceptual dissimilarity.

To achieve the third object of the invention, there is provided a device for measuring a similarity between texture features of images. The device includes a statistical dissimilarity computing part for computing a statistical dissimilarity between the images; a perceptual dissimilarity computing part for computing a perceptual dissimilarity between the images; and a texture feature dissimilarity computing part for computing a dissimilarity between the texture features of the images based on the statistical dissimilarity and the perceptual dissimilarity.

BRIEF DESCRIPTION OF THE DRAWINGS

The above objectives and advantages of the present invention will become more apparent by describing in detail preferred embodiments thereof with reference to the attached drawings in which.

DETAILED DESCRIPTION OF THE PRESENT INVENTION

Hereinafter, preferred embodiments of the present invention will be described in detail with reference to the attached drawings.

Figure 1:
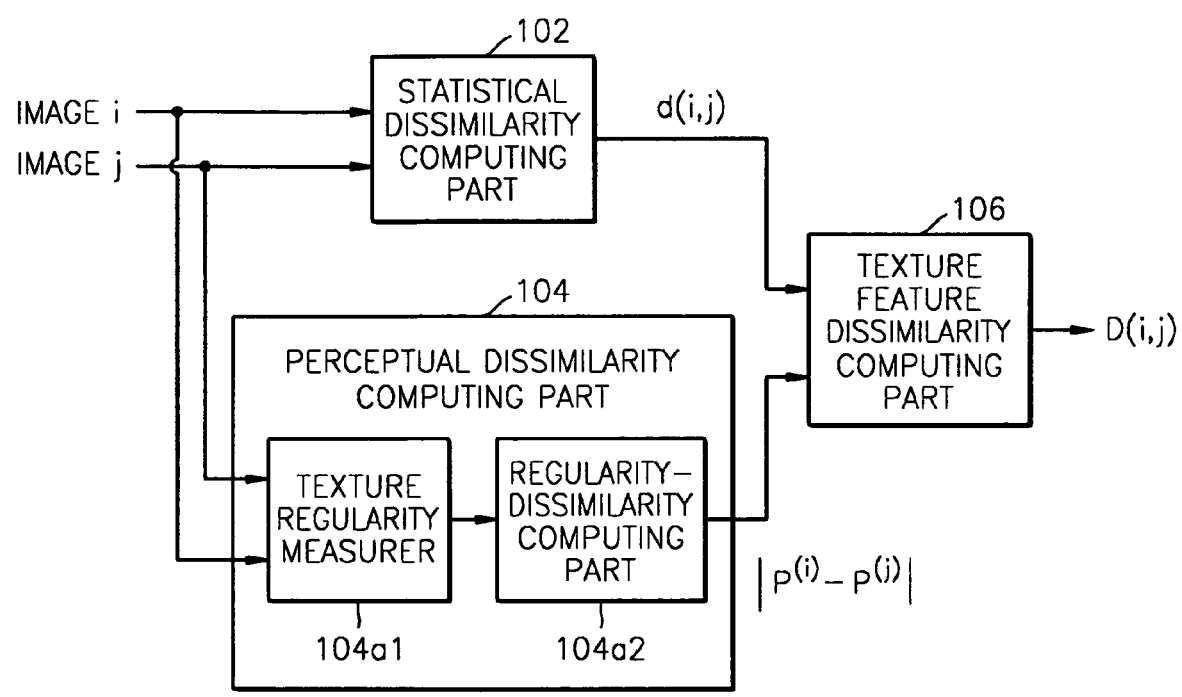
FIG. 1 is a block diagram illustrating the configuration of a device for measuring the similarity between images according to an embodiment of the present invention.
Figure 2:
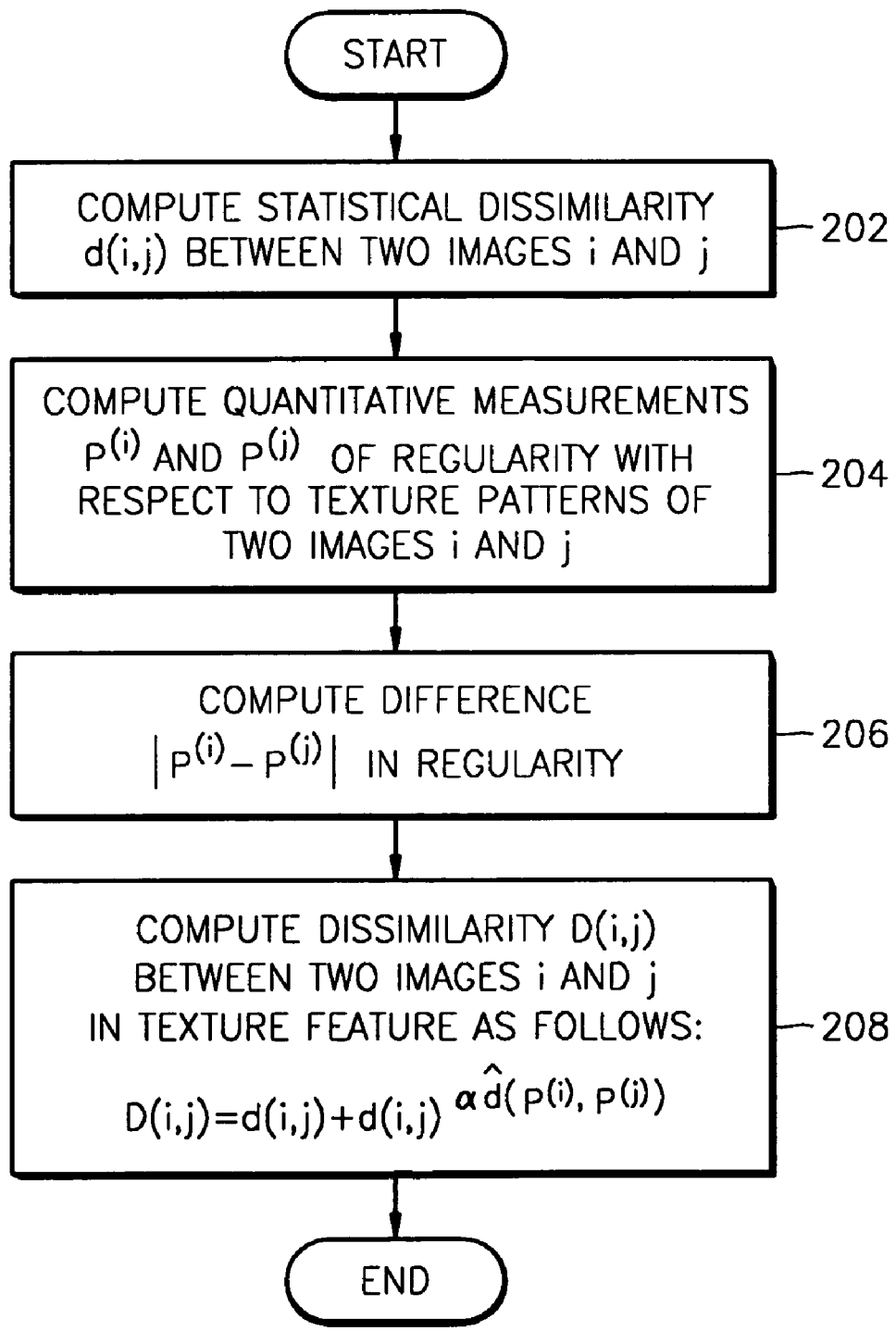
FIG. 2 is a flowchart illustrating the main steps of a method of measuring the similarity between images, which is performed in the device of FIG. 1 according to an embodiment of the present invention.

Referring to FIG. 1, a device for measuring the similarity between images according to an embodiment of the present invention includes a statistical dissimilarity computing part 102, a perceptual dissimilarity computing part 104 and a texture feature dissimilarity computing part 106. The perceptual dissimilarity computing part 104 includes a texture regularity measurer 104a1 and a regularity-dissimilarity computing part 104a2. FIG. 2 is a flowchart illustrating the main steps of a method of measuring the similarity between images, which is performed in the device of FIG. 1 according to an embodiment of the present invention.

In the operation of the device of FIG. 1, the statistical dissimilarity computing part 102 computes the statistical dissimilarity between two images i and j using a statistical-based texture descriptor in step 202. The computed dissimilarity is represented by d(i, j). The statistical dissimilarity may be computed according to the expanding radius of a sphere centered at a feature victor as described above. Other statistical descriptors may also be used.

Next, the texture regularity measurer 104a1 in the perceptual dissimilarity computing part 104 quantitatively measures the perceptual attribute of texture. In this embodiment, the texture regularity measurer 104a1 quantitatively measures the regularity of texture as the perceptual attribute of the texture. In other words, in step 204, the texture regularity measurer 104a1 obtains quantitative measurements $P^{(i)}$ and $P^{(j)}$ of regularity with respect to the texture pattern of the two images i and j. The quantitative measurements $P^{(i)}$ and $P^{(j)}$ are integers within a certain range. Larger values of the quantitative measurements $P^{(i)}$ and $P^{(j)}$ indicate stronger regularities of the texture. The regularities of the two images i and j can be computed using the quantitative measurements of the perceptual attribute of the texture. A method of obtaining a texture descriptor containing a perceptual browsing component (PBC) by extracting the PBC based on a quantitative measurement of a perceptual attribute of texture is disclosed in U.S. patent application Ser. No. 09/272,321, which was filed by this applicant on Mar. 19, 1999 and which is incorporated into the present specification by reference. Accordingly, the texture descriptor containing the PBC will not be further described in this specification.

Figure 3:
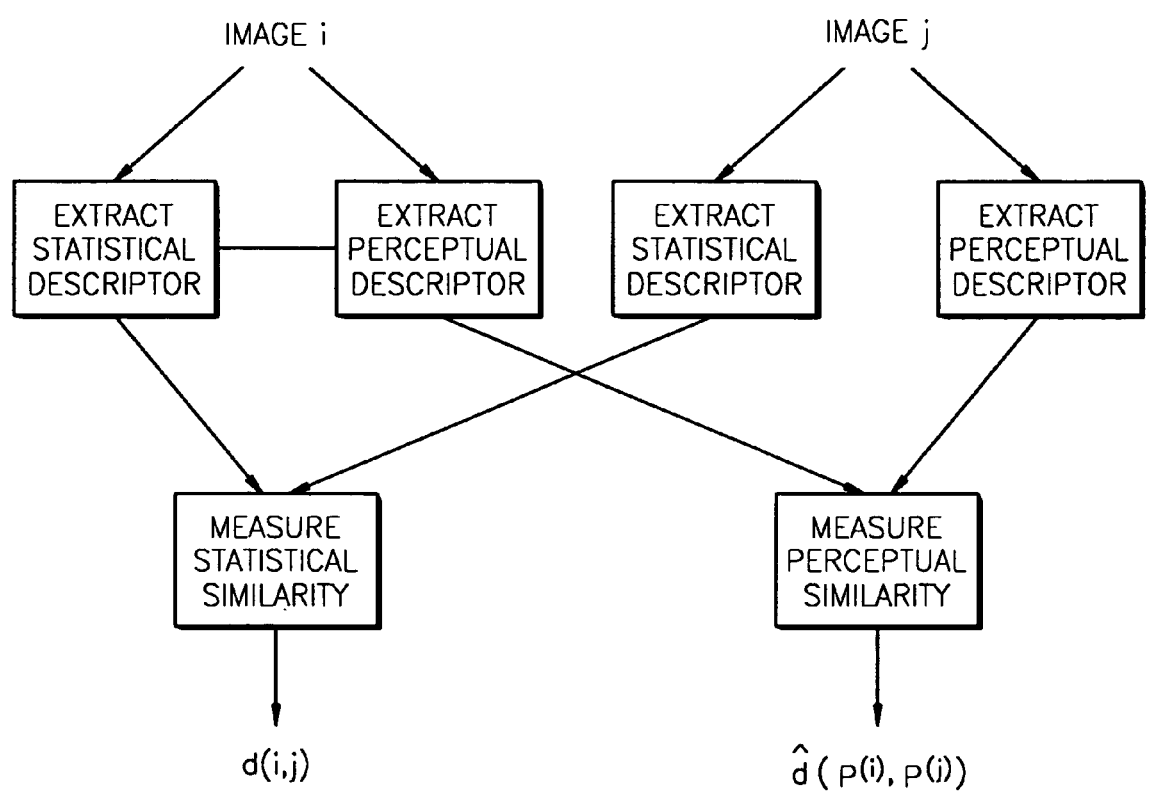
FIG. 3 is a diagram illustrating a framework of measuring the similarity between two images.

Next, in step 206, the regularity-dissimilarity computing part 104a2 computes the dissimilarity between the texture patterns of the two images i and j in terms of regularity and outputs regularity-dissimilarity data $|P^{(i)}-P^{(j)}|$ as the result. FIG. 3 is a diagram illustrating a framework for measuring the similarity between two images. Referring to FIG. 3, the statistical components and the perceptual components of the images i and j are obtained. The statistical dissimilarity d(i, j) and the perceptual dissimilarity $\hat{d}(|P^{(i)},P^{(j)}|)$ of the two images i and j are obtained. In this embodiment, the perceptual dissimilarity $\hat{d}(|P^{(i)},P^{(j)}|)$ is obtained from the regularity of texture features. Other perceptual measures of texture, such as directionality, may also be used.

The texture feature dissimilarity computing part 106 computes the dissimilarity between texture features of the two images using the statistical dissimilarity data output from the statistical dissimilarity computing part 102 and the regularity-dissimilarity data output from the regularity-dissimilarity computing part 104a2. In this embodiment, assuming α is a predetermined scaling factor, the dissimilarity D(i, j) of texture features of the two images i and j is computed by Equation (1) in step 208.

$$D(i,j)=d(i,j)+d(i,j)^{\alpha \hat{d}(P^{(i)},P^{(j)})} \quad (1)$$

The value of the scaling factor α depends on the effectiveness of the statistical description d(i, j). For a more reliable descriptor, the value of α is relatively small. Here, d(i, j) indicates a dissimilarity computed using a statistical-based texture descriptor, $\hat{d}$ indicates a predetermined function whose value is determined depending on the range of magnitude of the perceptual dissimilarity, and $\hat{d}(|P^{(i)},P^{(j)}|)$ indicates the measurement of dissimilarity between the texture patterns of the two images i and j in terms of regularity. For example, the computation of $\hat{d}$ is defined as $$\hat{d}(P^{(i)}, P^{(j)}) = \begin{cases} 0 & |P^{(i)} - P^{(j)}| \leq 1 \\ |P^{(i)} - P^{(j)}| & |P^{(i)} - P^{(j)}| > 1 \end{cases} \quad (2)$$

The results of measuring the similarity between images using Equation 1 according to the similarity measuring method in different circumstances will be described.

First, according to the present invention, when both the statistical dissimilarity and the perceptual dissimilarity exceed a predetermined threshold, the dissimilarity between texture features is determined by a combination of the statistical dissimilarity and the perceptual dissimilarity. Assuming that the image j is an object to be measured and the image i is a query image in this embodiment, if the statistical dissimilarity d(i, j) and the perceptual dissimilarity between the two images i and j are both large, that is, if $|P^{(i)}-P^{(j)}|>1$, $d(i,j)^{\alpha \hat{d}(P^{(i)},P^{(j)})}$ increases exponentially. Accordingly, the dissimilarity D(i, j) of texture patterns of the two images i and j rapidly increases, which means that the image j is very different from the image i in terms of the regularity of a texture feature. With regard to search results, the exponential increase of $d(i, j)\alpha \hat{d}(P^{(i)}, P^{(j)})$ will push one pattern away and provide a chance for another pattern which is a little bit beyond the closest N matches, but which has similar regularity as the query pattern to be retrieved.

Second, according to the present invention, when a perceptual dissimilarity is smaller than the predetermined threshold, the dissimilarity between texture features is determined by a value proportional to a statistical dissimilarity. When the perceptual dissimilarity between the two images i and j is small in this embodiment, that is, when $|P^{(i)}-P^{(j)}|\leq 1$, the magnitude of an exponent term, $d(i,j)^{\alpha \hat{d}(P^{(i)},P^{(j)})}$, drops very fast and approaches 0. Accordingly, the dissimilarity D(i, j) of texture patterns approaches the statistical dissimilarity d(i, j), where d(i, j)>>1.

Third, when a statistical dissimilarity is smaller than the predetermined threshold, but a perceptual dissimilarity exceeds the predetermined threshold, the dissimilarity between texture features is partially determined depending on the perceptual dissimilarity. When the statistical dissimilarity d(i, j) is small but the perceptual dissimilarity is large, that is, when $|P^{(i)}-P^{(j)}|>1$, the dissimilarity D(i, j) of texture patterns is determined by the exponent of the second statistical dissimilarity component, wherein the exponent is the perceptual dissimilarity. However, since the statistical dissimilarity is relatively small, the dissimilarity between the texture features is only slightly influenced by the perceptual dissimilarity.

According to a method of measuring the similarity between images described above, the dissimilarity between texture features of the images is determined using the statistical dissimilarity and the perceptual dissimilarity between the texture features. When images perceptually similar to a query image are searched and retrieved according to the above measuring method, the possibility that the retrieved images are not perceptually similar to the query image is small. Accordingly, the present invention can improve the image searching performance when searching images having texture features similar to that of a query image. It is preferable that such a method of measuring the similarity between images according to the present invention is applied to content-based image searching.

Since when a dissimilarity is large, a similarity is small, but when a dissimilarity is small, a similarity is large, measuring of a dissimilarity is equivalent to measuring a similarity. Accordingly, the present invention is referred to as a similarity measuring method although it measures a dissimilarity.

A method of measuring the similarity between images according to the present invention can be written as a program which can be executed in a personal computer or a server computer. Program codes and code segments constructing the programs can be easily inferred by computer programmers skilled in this art. The programs can be stored in a computer-readable recording medium. The computer-readable medium can be a magnetic recording medium, an optical recording medium or a radio medium.

In the above embodiment, the dissimilarity between texture features has been obtained using the exponent of the power of a statistical dissimilarity, wherein the exponent is a perceptual dissimilarity. However, it will be apparent to one of ordinary skill in the art that modifications to the described embodiment may be made without departing from the spirit and scope of the invention. Accordingly, the scope of the present invention defined by the attached claims is not restricted to the above embodiment.

What is claimed is:

1. A method of measuring a textural similarity of images, the method comprising:
   automatically determining a statistical dissimilarity $(d(i, j))$ between the images $(i, j)$; and
   automatically determining a perceptual dissimilarity $(\hat{d}|P^{(i)}-P^{(j)}|)$ between the images; and
   automatically determining a textural dissimilarity $(D(i, j))$ based on the statistical dissimilarity $(d(i, j))$ and a function of the perceptual dissimilarity $(\hat{d}(|P^{(i)}-P^{(j)}|))$ where $\hat{d}$ is a function whose value is dependant on a range and magnitude of the perceptual dissimilarity,
   wherein the textural dissimilarity $D(i, j)$ is determined according to an equation $D(i, j)=d(i, j)+d(i, j)^{\alpha d(P_{(i)}, P_{(j)})}$ where $\alpha$ is a predetermined scaling factor and $\hat{d}$ is a function defined as:

$$\hat{d}(P^{(i)}, P^{(j)}) = \begin{cases} 0 & |P^{(i)} - P^{(j)}| \le 1 \\ |P^{(i)} - P^{(j)}| & |P^{(i)} - P^{(j)}| > 1. \end{cases}$$

2. A method according to claim 1, wherein determining the perceptual dissimilarity $(|P^{(i)}-P^{(j)}|)$ comprises:
   determining quantitative measurements $(P^{(i)}, P^{(j)})$ of a textural regularity of the respective images $(i, j)$; and
   determining a difference between said quantitative measurements $(P^{(i)}, P^{(j)})$.

3. A method according to claim 1, wherein the textural dissimilarity $(D(i, j))$ is a value proportional to the statistical dissimilarity $(d(i, j))$ when the perceptual dissimilarity $(|P^{(i)}-P^{(j)}|)$ is not larger than a predetermined threshold.

4. A method according to claim 1, wherein a degree of influence of the statistical dissimilarity on the textural dissimilarity $(D(i, j))$ is determined based on a magnitude of the perceptual dissimilarity $(|P^{(i)}-P^{(j)}|)$ when the perceptual dissimilarity $(|P^{(i)}-P^{(j)}|)$ is greater than a predetermined threshold.

5. A computer-readable recording medium storing a computer program for executing a method of measuring a textural similarity of images, wherein the method comprises:
   automatically determining a statistical dissimilarity $(d(i, j))$, between the images $(i, j)$; and
   automatically determining a perceptual dissimilarity $(|P^{(i)}-P^{(j)}|)$ between the images and
   automatically determining a textural dissimilarity $(D(i, j))$ based on the statistical dissimilarity $(d(i, j))$ and a function of the perceptual dissimilarity $(\hat{d}(|P^{(i)}-P^{(j)}|))$ where $\hat{d}$ is a function whose value is dependant on a range and magnitude of the perceptual dissimilarity
   wherein the method comprises determining said textural dissimilarity $D(i, j)$ in accordance with the equation $D(i, j)=d(i, j)+d(i, j)^{\alpha d(P^{(i)}, P^{(j)})}$, where $\alpha$ is a predetermined scaling factor and the function $\hat{d}$ is defined as:

$$\hat{d}(P^{(i)}, P^{(j)}) = \begin{cases} 0 & |P^{(i)} - P^{(j)}| \le 1 \\ |P^{(i)} - P^{(j)}| & |P^{(i)} - P^{(j)}| > 1. \end{cases}$$

6. An apparatus for measuring a textural similarity of images, the apparatus comprising:
   means for automatically determining a statistical dissimilarity $(d(i, j))$ between the images $(i,j)$; and
   means for automatically determining a textural dissimilarity $(D(i, j))$ based on the statistical dissimilarity $(d(i, j))$ and a function of a perceptual dissimilarity $(\hat{d}(|P^{(i)}-P^{(j)}|))$ where $\hat{d}$ is a function whose value is dependant on a range and magnitude of the perceptual dissimilarity
   wherein the means for determining the textural dissimilarity $D(i, j)$ is configured to determine the textural dissimilarity $D(i, j)$ according to the equation $D(i, j)=d(i, j)+d(i,j)^{\alpha d(P^{(i)}, P^{(j)})}$, where $\alpha$ is a predetermined scaling factor and $\hat{d}$ is a function defined as:

$$\hat{d}(P^{(i)}, P^{(j)}) = \begin{cases} 0 & |P^{(i)} - P^{(j)}| \le 1 \\ |P^{(i)} - P^{(j)}| & |P^{(i)} - P^{(j)}| > 1. \end{cases}$$

7. An apparatus according to claim 6, wherein the means for determining the perceptual dissimilarity $(\hat{d}(|P^{(i)}-P^{(j)}|))$ comprises:
   means for determining quantitative measurements $(P^{(i)}, P^{(j)})$ of a textural regularity of the respective images $(i,j)$; and
   means for determining a difference between said quantitative measurements $(P^{(i)}, P^{(j)})$.

8. An apparatus according to claim 6, wherein the means for determining the textural dissimilarity (D(i, j) is configured to determine the textural dissimilarity (D(i, j)) as a value proportional to the statistical dissimilarity (d(i, j)) when the perceptual dissimilarity ($|P^{(i)}-P^{(j)}|$) is not larger than a predetermined threshold.

9. An apparatus according to claim 6, wherein the means for determining the textural dissimilarity (D(i, j)) is configured to control a degree of influence of the statistical dissimilarity on the textural dissimilarity (D(i, j)) in dependence on the magnitude of the perceptual dissimilarity ($|P^{(i)}-P^{(j)}|$) when the perceptual dissimilarity ($|P^{(i)}-P^{(j)}|$) is greater than a predetermined threshold.

* * * * *